May 14, 1929.  F. O. BEAULIEU  1,713,018
COMBINED CLUTCH AND BRAKE
Filed Oct. 19, 1927
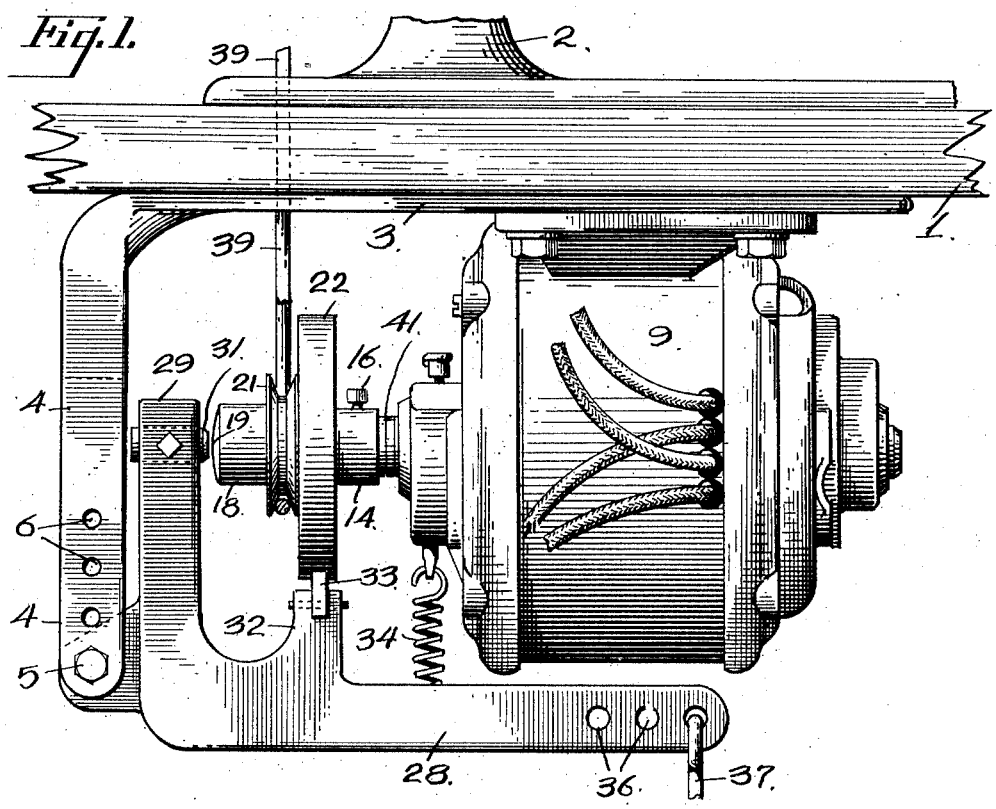
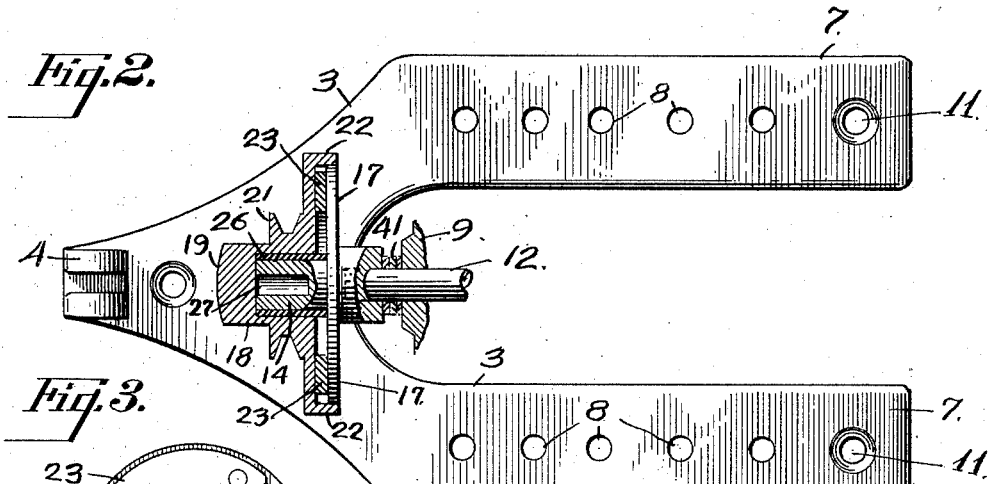
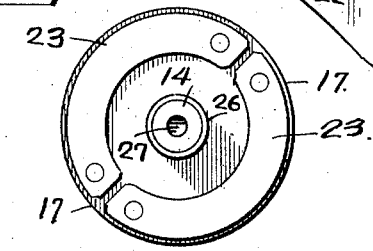
INVENTOR.
FRANK O. BEAULIEU.

Patented May 14, 1929.

1,713,018

UNITED STATES PATENT OFFICE.

FRANK O. BEAULIEU, OF SAN FRANCISCO, CALIFORNIA.

COMBINED CLUTCH AND BRAKE.

Application filed October 19, 1927. Serial No. 227,236.

My invention relates to a new article of manufacture comprising a new and improved combined clutch and brake therefor, wherein a disc, connected to the end of an armature shaft, has loosely mounted thereon a sleeve provided with a pulley and brake drum, which sleeve and disc, operate in conjunction with a lever arranged to move the brake drum into engaging relation with the disc to rotate the pulley, or to automatically and frictionally engage said drum to prevent rotation thereof when the said drum is released from engaging relation with said disc.

The primary object of the present invention is to provide a new and improved article of manufacture comprising a combined clutch and brake drum whereby rotation may be quickly and easily imparted to a pulley and whereby rotation of said pulley may be quickly stopped at intervals.

Another object of the present invention is to provide a new and improved article of manufacture comprising a combined clutch and brake therefor having a lever arranged to quickly move a loose pulley thereon into engaging relation with a rotating part of the clutch and to automatically prevent rotation of said pulley when said lever is moved to disengage said pulley from said rotating part.

A further object of the present invention is to provide a new and improved article of manufacture of the character described having few working parts of simple, economical and efficient construction, arrangement, and operation.

I accomplish these and other objects by means of the improved device disclosed in the drawings forming a part of the present application wherein like characters of reference are used to designate similar parts throughout the specification and drawings, and in which—

Fig. 1 is a side elevation of my improved clutch and brake;

Fig. 2 is a broken bottom plan view with the operating lever and motor removed; and Fig. 3 is a detailed view of the disc.

Referring to the drawings the numeral 1 is used to designate a table, bench, or other supporting structure upon which is placed a machine 2 to be operated, such as a sewing machine.

Suspended from the lower surface of the bench 1 is a bracket 3 having a bifurcated arm or extension 4 arranged dependent and preferably at right angles thereto and provided centrally and longitudinally with a row of apertures 6, the purpose of which will hereinafter be more fully set forth.

The bracket 3 is also bifurcated to provide parallel arms 7 also provided with a plurality of centrally and longitudinally disposed apertures 8 by means of which various sizes of electric motors 9 may be suspended, as disclosed in Fig. 1 of the drawings. The bracket 3 may be suspended from the lower surface of the bench 1 by means of suitable screws or bolts, or other suitable fastening means, not shown, projected through the apertures 11 and into said bench 1.

Upon one end of the motor or armature shaft 12 projecting slightly beyond the motor 9 I have mounted a shaft 14 provided with an axial aperture to engage said motor shaft 12, as disclosed in Fig. 2 of the drawings. The shaft 14 has, formed integral therewith and intermediate the ends thereof, a disc 17. Loosely mounted upon the opposite or free end of the shaft 14 I have provided a sleeve 18 closed at its outer end as at 19, and also provided with an integrally formed pulley 21 and a brake drum 22, said brake drum being arranged to frictionally engage a suitable frictional lining 23 rigidly secured to the disc 17.

The shaft 14 is provided with a suitable set screw 16, by means of which it may be rigidly connected to the motor-shaft 12, and also with a suitable bronze bushing 26 upon its outer or free end, upon which the sleeve 18 is slidably and rotatably mounted. The outer or free end of said shaft 14 is also provided with a second axial aperture 27 within which lubricant may be placed to properly lubricate the parts when moving in relation to each other.

Pivotally mounted within the bifurcated arm 4 of the bracket 3, and by means of a suitable bolt or other pivot 5 inserted through one of the apertures 6, I have mounted a lever fulcrumed upon the bolt or pivot 5. The lever 28 is provided with an arm 29 carrying a preferably wooden peg 31 and aligned with the closed end 19 of the sleeve 18 as disclosed in Fig. 1 of the drawings, the purpose of which will hereinafter be more fully set forth.

The lever 28 is also provided with a second arm or extension 32 provided with a frictional member 33 to engage the periphery of the brake drum 22, as disclosed in Fig. 1 of the drawings. The free end of the lever 28 is also provided with a plurality of centrally and longitudinally aligned apertures 36 in one of which is connected a suitable rod 37, or other suitable connection, to an operating pedal, not shown.

A suitable spring 34 has one end connected to the motor housing 9 and its other end to the free end of the lever 28 whereby the tension of said spring 34 may normally retain the lever 28 in a position where the member 33 will impinge tightly against the periphery of the brake drum 22 and normally prevent rotation of said brake drum 22, and, consequently, the pulley 21.

A suitable belt, or other transmission member 39 engages the pulley 21 and from thence to the machine 2 upon the bench 1, as disclosed in Fig. 1 of the drawings.

In order to remove the thrust of the device from the armature of the motor 9, I have provided suitable thrust bearings 41 mounted upon the projecting end of the motor shaft 12 and between the inner end of the shaft 14 and the motor 9, as disclosed in section in Fig. 2 of the drawings.

In operation, the lever 28 is normally held, by the tension of the spring 34, with the arm 32 and its frictional member 33 in engaging relation with the periphery of the brake drum 22 thereby preventing rotation of the said drum 22, pulley 21 and sleeve 18. The near end of the wooden plug 31 in the end of the first arm 29 of the lever 28, is normally held in spaced relation with the closed end 19 of the sleeve 18, as disclosed in Fig. 1 of the drawings.

While the motor 9 is running, and it is desired to operate the machine 2 from said motor, the free end of the lever 28 is depressed by means of the rod 37 whereby said lever 28 will then be moved to release the member 33 from engaging relation with the brake drum 22 and the arm 29 of said lever 28 will then move the wooden plug 31 into engaging relation with the closed end 19 of the sleeve 18 and thereby move the brake drum 22 to engage the frictional lining 23 of the disc 17 whereby rotation will be imparted to the said brake drum 22 and to the pulley 21 formed integrally therewith, thereby rotating said pulley 21 and through the medium of the cord or belt 39 motion is imparted to the sewing or other machine 2 upon the bench 1.

When it is desired to discontinue motion of the machine 2 the lever 28 is released and the tension of the spring 34 will then automatically and instantly move the lever 28 to remove the pressure of the wooden plug 31 from the closed end 19 of the sleeve 18 thereby releasing the pressure by which the brake drum is held in frictional engagement with the lining 23 of the disc 17, and at the same time the member 33 will be moved into frictional engagement with the periphery of the brake drum 22 and thereby prevent further rotation of said drum and the sleeve 18 of which it is an integral part.

When pressure is applied by the wooden plug 31 to the closed end 19 of the sleeve 18 to move the brake drum 22 into engaging relation with the disc 17, the resulting thrust is imparted to the thrust bearings 41 which in turn will transmit said thrust to the motor housing 9, as disclosed in Fig. 2 of the drawings, thereby preventing said thrust from being transmitted to the armature of the motor.

Having thus described my invention what I claim as new and desire to secure by Letters Patent is—

1. A new article of manufacture comprising the combination with a motor and motor shaft of a shaft extension having a disc formed integral therewith and intermediate between the ends thereof and provided at one end with an aperture to engage the motor-shaft; means for securing said extensions upon the motor shaft; a thrust bearing mounted between the extension and the motor to prevent thrust upon the motor shaft; a pulley loosely mounted upon the opposite end of said extension and provided with a drum for engaging the disc on the extension; and a pivotally mounted lever provided with one arm to engage the drum of the loose pulley and a second arm to move the pulley axially into engaging relation with the disc whereby said pulley may be rotated by said disc when the motor shaft is rotating.

2. A new article of manufacture comprising the combination with a motor and motor shaft of a shaft extension having a disc formed integral therewith and intermediate the ends thereof, one end of said shaft extension being provided with an axial aperture to engage a motor shaft; a sleeve mounted upon the other end of the shaft extension and having a brake drum and a pulley formed integral therewith and a closed outer end, said brake drum being arranged to engage the disc on the shaft extension; and a pivotally mounted lever having an arm to engage the periphery of the brake drum and a second arm having the end thereof arranged in spaced relation with the closed end of the sleeve whereby said lever may be moved to disengage the brake-drum and engage the closed end of the sleeve and thereby move the drum on said sleeve into engaging relation with the disc to rotate the pulley; and means for preventing a thrust on said sleeve and shaft extension from being transmitted to the motor shaft.

3. A new article of manufacture comprising a bracket consisting of a yoke shaped body having apertures arranged to receive motor mounting bolts and having an arm for pivotally supporting a lever; a motor suspended below said bracket and opposite said arm and having a shaft projecting from one end thereof; a shaft extension having a disc formed integral therewith and intermediate the ends thereof and provided at one end with an axial aperture to engage the projecting end of the motor shaft extension; a sleeve loosely mounted upon the other end of the shaft extension and having a pulley and a brake-drum formed integral therewith, said drum being arranged to engage the disc on the shaft extension, and said sleeve being closed at its outer end; and a lever fulcrumed in the end of the arm on the bracket and provided with an arm to engage the periphery of the brake-drum to prevent rotation thereof, and a second arm positioned opposite and in spaced relation with the closed end of the sleeve, whereby said lever may be moved to disengage the periphery of the brake-drum and engage the closed end of the sleeve and move the drum thereof axially into engaging relation with the disc on the shaft extension whereby said drum and pulley may be rotated when the motor shaft is being rotated.

In witness whereof, I hereunto set my signature.

FRANK O. BEAULIEU.